United States Patent [19]

Bolin

[11] Patent Number: 5,070,710
[45] Date of Patent: Dec. 10, 1991

[54] GARMENT BLANK AND METHOD OF MAKING IT

[75] Inventor: Michael J. Bolin, Clover, S.C.

[73] Assignee: Sara Lee Corporation, Winston-Salem, N.C.

[21] Appl. No.: 307,607

[22] Filed: Feb. 7, 1989

[51] Int. Cl.[5] .............................................. A41B 9/02
[52] U.S. Cl. ..................................................... 66/177
[58] Field of Search .................. 66/175, 176, 177, 189

[56] References Cited

U.S. PATENT DOCUMENTS

| | | | |
|---|---|---|---|
| 3,599,241 | 8/1971 | Rossler | 66/176 X |
| 3,814,812 | 7/1974 | Matthews et al. | 66/177 |
| 3,906,754 | 9/1975 | Sackman | 66/177 |
| 4,010,627 | 3/1977 | Pernick | 66/177 |
| 4,043,156 | 8/1977 | Pernick | 66/177 |
| 4,624,115 | 11/1986 | Safrit et al. | 66/176 X |
| 4,682,479 | 7/1987 | Pernick | 66/176 |

FOREIGN PATENT DOCUMENTS

| | | | |
|---|---|---|---|
| 2220150 | 9/1974 | France | 66/176 |
| 1304220 | 1/1973 | United Kingdom | 66/176 |

Primary Examiner—Werner H. Schroeder
Assistant Examiner—John J. Calvert

[57] ABSTRACT

A tubular blank for making briefs or panties in which a body section is formed with a circular knitting machine so as to have a first section knit with a stitch to be used in the garment and second sections on either side that are to be cut out to form leg openings or the like, the second sections being knit with yarn from spaced courses of the first section.

9 Claims, 2 Drawing Sheets

GARMENT BLANK AND METHOD OF MAKING IT

BACKGROUND OF THE INVENTION

Garments such as briefs or panties have been made by knitting a tubular blank on a circular knitting machine and cutting out areas on opposite sides that form leg openings when the front and rear ends of the blank are sewn together. As described in U.S. Pat. No. 4,628,115, guide lines for the cutting operation may be formed in the blank by a distinctive stitch such as a tuck stitch in a jersey knit or by knitting the entire area to be cut out with a distinctive stitch so that the line of demarcation between it and the rest of the blank serves as a cutting guide. It is estimated that the process wastes about 20% of the yarn depending on the particular design of the brief or panty. In the highly competitive garment industry this amount of waste is very significant.

As described in U.S. Pat. No. 4,043,156, this waste is substantially eliminated by knitting the blank with a shape that does not require cutting. In particular, an elastic waistband is knit in the form of a transfer or double welt. Then a number of complete circular courses are knit so as to form a body section, and front and rear panels are knit to the body section. The width of each panel is reduced as the knitting proceeds so as to provide the shape required for the leg opening. This is done by successively casting off yarn from needles located between the panels. At the end of the tapered section thus formed an untapered end section is knit to each panel having parallel sides along given wales. The brief or panty is made by overlapping the untapered end sections and sewing them together to form the leg openings. As the casting off operation leaves yarn ends or floats along the edges of the panels, it is necessary to sew a width of trimming material along the edges of the leg openings.

Whereas this method of making briefs or panties reduces the amount of wasted yarn, it inherently slows the rate of production. Furthermore, the tapered edges of the panels curl so as to make it difficult to sew the trimming to the edges of the leg openings.

BRIEF SUMMARY OF THE INVENTION

In accordance with this invention, a first section of a tubular knit blank is formed with the kind of stitches desired in the garment, and second sections that are to be included in each area to be cut out so as to form a leg opening or the like are knit with yarn from the same feeders that provide yarn for courses of the first section that are spaced so that there are courses between at least some of them. The yarn of the in between courses is cut at one side of the second sections, and normal knitting is resumed at the other side of the section. Yarn from the feeder supplying each successive selected course is knit to the previous selected course. If, for example, the second section is knit with yarn from the same feeder as every fourth course of the first section, it would have 75% less yarn than it would have if it were knit with yarn from all courses. An important fact is, however, that second sections formed with less yarn in this manner reduce curling to a point where it does not seriously interfere with subsequent cutting and sewing along a cutting guide line lying within the first section that extends across the wales. This guide line is spaced far enough from the junction of the first and second sections to prevent the ends or floats resulting from the cutting of the yarn of the intermediate courses from interfering with the operation of a machine that cuts along the guide line and sews trim to the edge thus formed.

Whereas the second sections can be knit with yarn from feeders respectively supplying yarn for every fourth course as suggested above, the spacing of the courses could be different. Furthermore, even though it would not save as much yarn, the yarn from feeders for groups of adjacent courses that are spaced from each other could be used.

Although a jersey stitch is generally used in knitting the second sections, other stitches such as an alternate one by one could be used, and any stitch can be used in the first section.

DETAILED DESCRIPTION OF THE INVENTION

Figure 1:
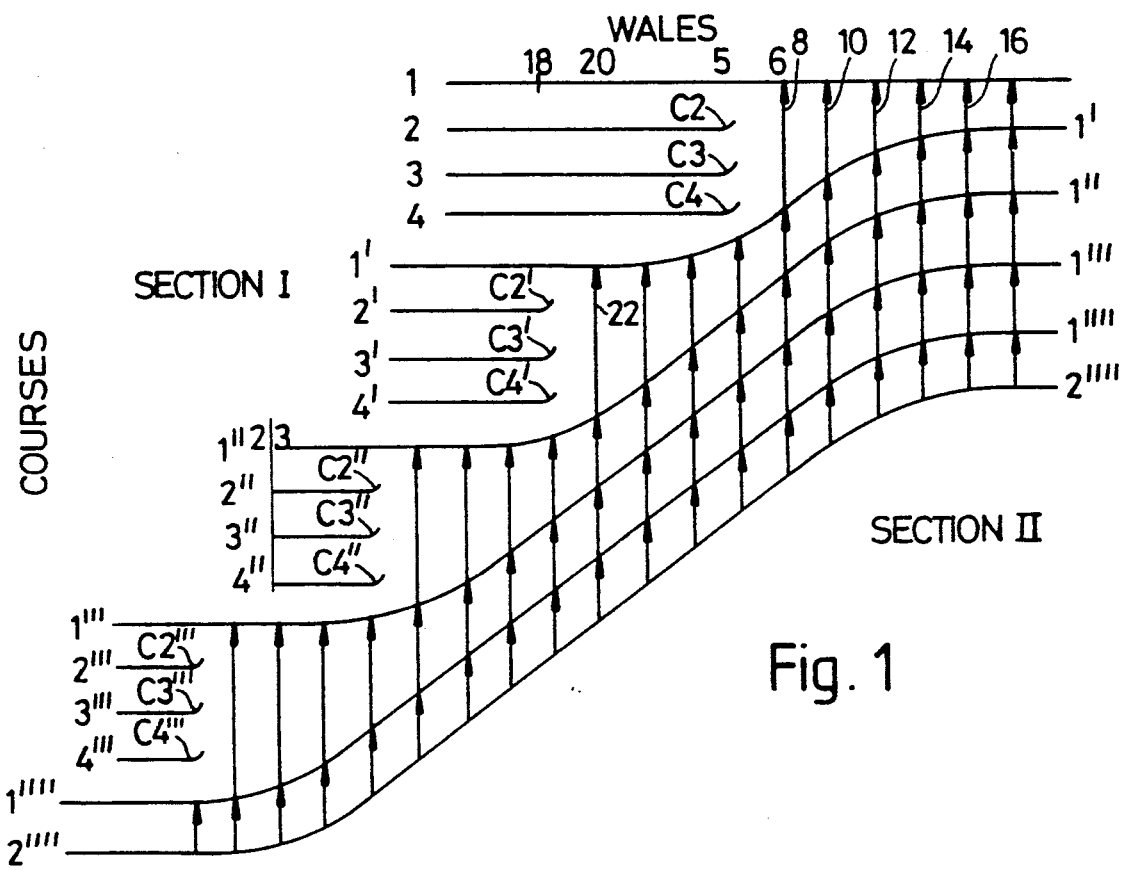
FIG. 1 is a schematic diagram of the stitching of a second section to a first section along a 45° transition.

FIG. 1 is a diagram showing what the yarn from a feeder for every fourth course of a first section I is knit to in order to form a second section II. No attempt has been made to show the actual positions of certain stitches because that would involve showing puckers that are formed when yarn coming from an earlier knit course is knit to a later knit course. The drawing is further simplified by not indicating the stitches in the section I and by indicating the stitches in the section II by arrows rather than showing the actual yarn. The ends or floats produced by cutting the yarn for the courses intermediate every fourth course at points where it enters the section II are shown by short upwardly directed diagonal lines. Courses are represented by horizontal lines, wales are represented by vertical lines, and the knitting proceeds in a downward direction.

Course 1 runs from the section I across the top of the section II, and the diagonal lines $c_2$, $c_3$ and $c_4$ show the yarn ends or floats that are produced when the yarns of the successive courses 2, 3 and 4 are cut just after a wale 5. Although not shown, knitting is resumed in the courses 2, 3 and 4 at the other side of the section II as each course is knit.

Yarn from the same feeder that supplied the yarn for a course 1' is knit to the course 4 in the usual manner, but the stitches are not indicated by arrows because they are part of the section I and not part of the section II. After the stitch at the wale 5 is completed, yarn from the feeder supplying yarn for the course 1' is knit to the course 1 at a wale 6 as indicated by an arrow 8. From this point successive stitches are made to the course 1 as indicated by the arrows 10, 12, 14 and 16 so as to finish knitting the top course of the section II. Note, however, that it is aligned with the course 2 of section I.

When the stitch indicated by the arrow 8 is made, the yarn at the wale 5 of the course 1' is drawn toward the intersection of the wale 6 and the course 2 so as to form a pucker, not shown, but this presents no problem because it is to be cut out and disposed of.

Figure 3:
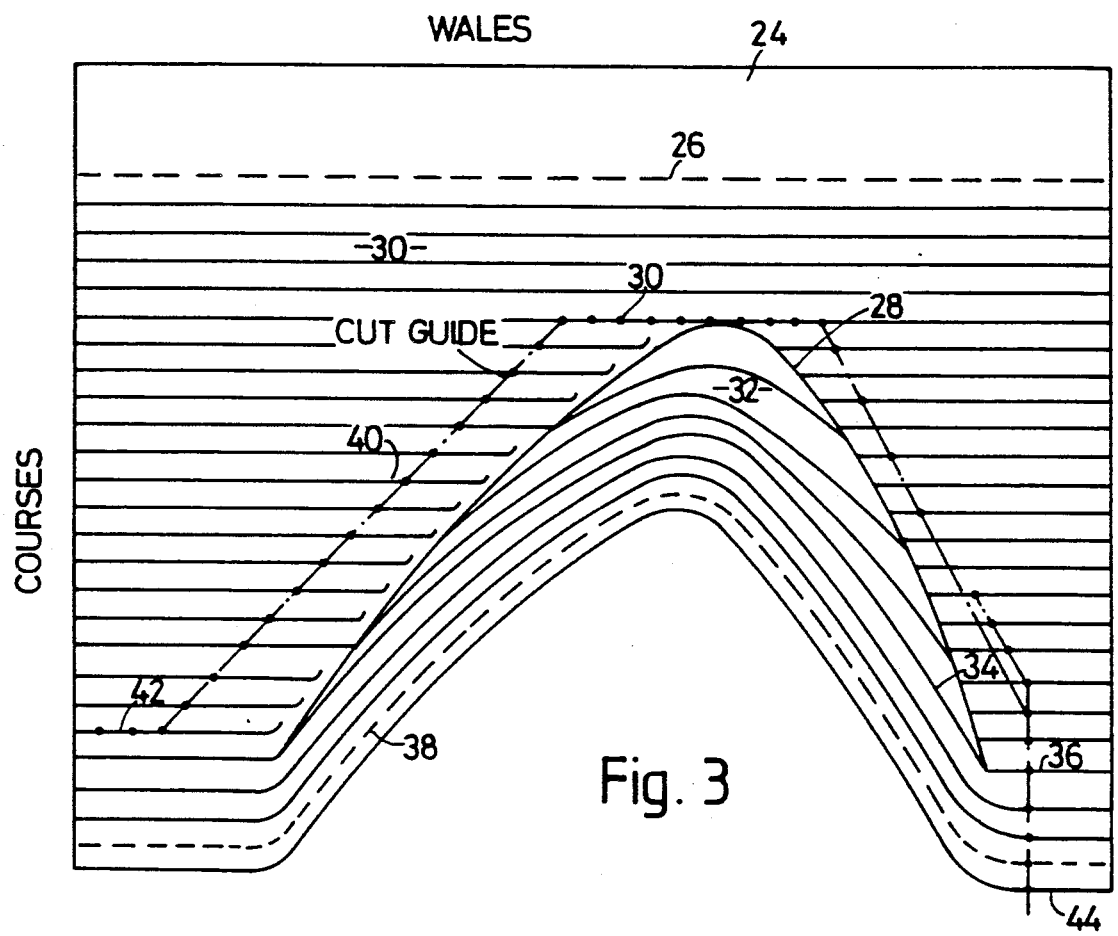
FIG. 3 shows one side of a blank constructed in accordance with this invention.

At this point the courses 2', 3' and 4' are knit in sequence with the yarn being cut just after a wale 18, and the knitting being resumed on the other side of the section II. Yarn for a course 1" is then knit as usual to the course 4' until it reaches the wale 18 after which it is knit to the course 1' at a wale 20 as indicated by an arrow 22. Inasmuch as the knitting of yarn for the courses 1''' and 1'''' corresponds to the knitting just described, there seems to be no need to explain it in detail. Puckers are formed when yarn from the courses 1', 1'', 1''' and 1'''' are first knit to the previous course so that the upper edge of the section I is uneven when it does not run along a course. The lower edge will be smooth, however. If the procedure just described were continued, a bottom course 2'''' would be cut out at a wale 23, but it can be knit as shown, and can, if desired, use the same type of stitch as used in the section I. A transform or double welt can be stitched at the very bottom so as to further inhibit curling. Knitting in this manner results in the second sections being of generally arcuate configuration and the juncture of each second section with the first section defining a generally arcuate path, as shown by FIGS. 1 and 3. The length of the yarn of the non-selected courses sequentially varies as shown by FIG. 1 and bounds the second sections in generally arcuate configurations.

Figure 2:
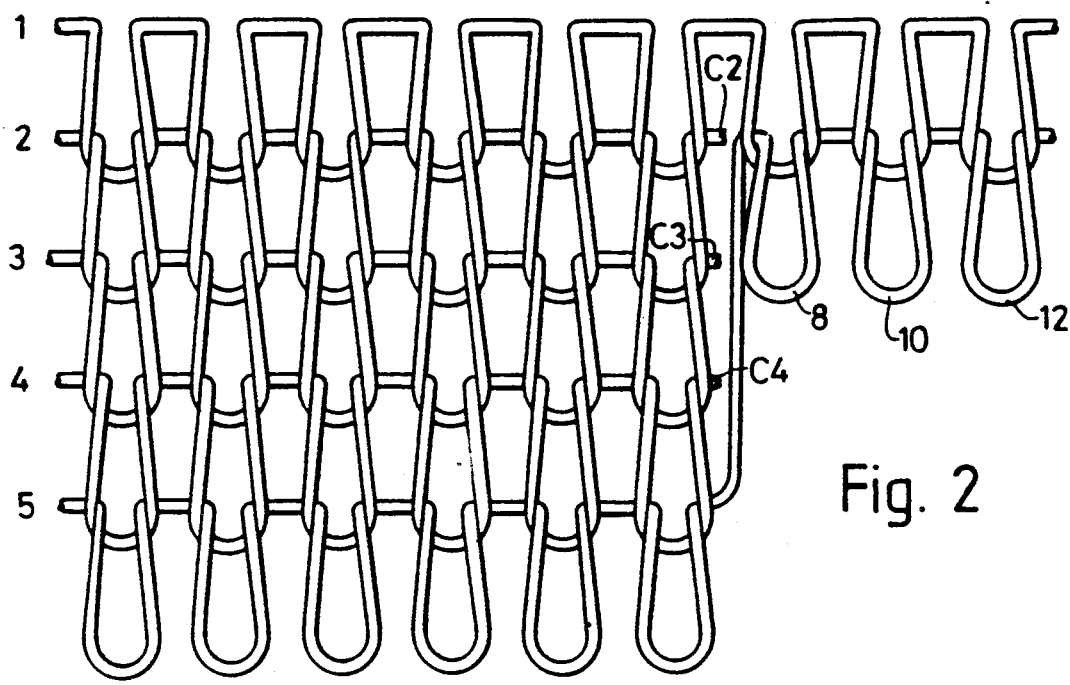
FIG. 2 shows the actual yarn in a few of the stitches occurring in a transition between first and second sections.

FIG. 2 shows the actual yarn when yarn from the course 1' is knit to the course 1 at the wale 6 by the stitch 8.

From the above description, it can be seen that a circular knitting machine can be operated continuously to form the blank of this invention. It knits course after course as usual except that during portions of courses lying within the sections II, it knits only during selected courses that are separated by other courses. Every fourth course was selected in the example described above, but any combination can be used as long as some courses are omitted.

As a non-preferred variation, needles for the wales of a course part way down the section II can be pressed off and normal knitting carried out in wales on either side from that point on.

FIG. 3 illustrates one side of a blank of this invention that is used for the manufacture of briefs or panties. A transfer or double welt section 24 between the top of the blank and courses at a dashed line 26 may be knit with elastic material so as to form a waistband. Below this are a number of complete courses knit as desired for the garment. A line 28 indicates the transition between a first section 30 and a second section 32 constructed in accordance with this invention. The second section 32 has a lower border 34 that is knit with yarn from the same feeder as the course 36. From this course on, the garment stitch of the section 30 may be resumed or other stitches may be used for a number of courses, and another transform may be formed between the bottom of the blank and a dashed line 38. At the end, the yarn is pressed off, and the manufacture of another garment is started. An advantage of a blank constructed in accordance with this invention is that the circular knitting machine with which it is made can be kept running at top speed because no pressing off is required until the next garment is to be made.

A cutting guide line 40 that lies within the first or garment section 30 is formed with a special stitch or yarn. The guide line 40 is displaced from the edge 28 of the second section 32 along which certain courses are cut in the manner described in order to prevent the cut ends of yarn from interfering with a machine that cuts along the guide line 40 and sews a trimming to the edge thus formed.

Figure 4:
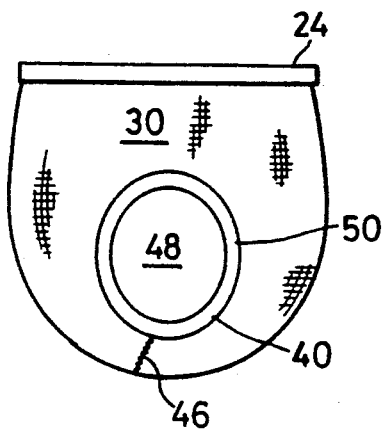
FIG. 4 shows a finished brief or panty made from a blank constructed in accordance with this invention.

FIG. 4 shows a brief or panty made from a blank like that of FIG. 3. The section II is not present because it has been cut out and disposed of and edges 42 and 44 of FIG. 3 are sewn together as indicated at a seam 46 so as to form a leg opening 48. The edge of leg opening 48 is along the cutting guide line 40. A trim 50 is sewn around the edge of the leg opening 48.

I claim:

1. A tubular knit black for use in manufacturing a garment comprising: (A) a first section knit of stitches to be used in the garment, said first section including selected courses of yarn spaced apart by non-selected courses of yarn; (B) second disposable sections being knit with yarn laterally connected to yarn in said selected courses of said first section, each of said second sections being of generally arcuate configuration; the yarn of said non-selected courses of said first section not extending beyond the juncture of said first and second sections so as to be absent from said second sections, the juncture of each of said second sections with said first section defining a generally arcuate path, said second sections to be cut away and removed from said first section to impart to said first section the requisite shape for forming the garment.

2. A tubular knit blank as set forth in claim 1 further comprising: cutting guide lines knit within said first section and respectively extending about the juncture of said first section and each of said second sections.

3. A tubular blank as set forth in claim 1 wherein: said first section is knit by a circular knitting machine with yarn with a given number of yarn feeders, and said second sections are knit by said circular knitting machine with yarn from a number of yarn feeders that is less than said given number.

4. A blank as set forth in claim 3 further comprising: a cutting line knit in said first section.

5. A tubular blank as set forth in claim 1 wherein said selected courses of said first section are uniformly spaced apart.

6. A tubular blank as set forth in claim 1 wherein said second disposable sections are knit with yarn vertically connected to courses of said first section.

7. A tubular blank as set forth in claim 6 wherein said second disposable sections are knit with yarn vertically connected to yarn in said selected courses of said first section.

8. A method of knitting a seamless tubular blank for use in forming a brief or panty garment having leg openings, said blank including a first section adapted to define the garment body portion and second sections adapted to be removed from the first section to give the first section the necessary configuration in forming the garment leg openings, comprising the steps of; forming the first section from selected courses and intermediate spaced non-selected courses while forming the second sections only from yarn of the selected courses, sequentially varying the lengths of adjacent non-selected courses to bound each second section in generally arcuate configuration with the juncture of the first section with each second section defining a generally arcuate path, and removing the second sections from the first section to give the selected configuration to the first section.

9. A method of making a blank as set forth in claim 8 wherein said first section is knit by a circular knitting machine with yarn from a given number of yarn feeders, and said second sections are knit by said circular knitting machines with yarn from a number of yarn feeders less than said given number.

* * * * *